United States Patent
Fevrier et al.

(10) Patent No.: US 11,560,020 B2
(45) Date of Patent: Jan. 24, 2023

(54) TIRE COMPRISING OPTIMIZED ARCHITECTURE AND TREAD PATTERN

(71) Applicant: COMPAGNIE GENERALE DES ETABLISSEMENTS MICHELIN, Clermont-Ferrand (FR)

(72) Inventors: Pierre Fevrier, Clermont-Ferrand (FR); Richard Abinal, Clermont-Ferrand (FR); Mathieu Albouy, Clermont-Ferrand (FR); Francois-Xavier Bruneau, Clermont-Ferrand (FR); Cyril Charreire, Clermont-Ferrand (FR); Patrick Pallot, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 485 days.

(21) Appl. No.: 16/619,209

(22) PCT Filed: Apr. 25, 2018

(86) PCT No.: PCT/FR2018/051046
§ 371 (c)(1),
(2) Date: Dec. 4, 2019

(87) PCT Pub. No.: WO2018/224743
PCT Pub. Date: Dec. 13, 2018

(65) Prior Publication Data
US 2020/0122519 A1 Apr. 23, 2020

(30) Foreign Application Priority Data

Jun. 8, 2017 (FR) ...................................... 1755081

(51) Int. Cl.
*B60C 11/13* (2006.01)
*B60C 1/00* (2006.01)
*B60C 9/00* (2006.01)

(52) U.S. Cl.
CPC ........ *B60C 11/1392* (2013.01); *B60C 1/0016* (2013.01); *B60C 2009/0035* (2013.01)

(58) Field of Classification Search
CPC .............. B60C 11/1392; B60C 1/0016; B60C 2009/0035; B60C 9/20; B60C 9/18; B60C 9/0007; B60C 2009/2016; B60C 9/22
See application file for complete search history.

(56) References Cited

U.S. PATENT DOCUMENTS 3,133,583 A   5/1964   Dobson
3,225,812 A   12/1965  Barrett
(Continued)

FOREIGN PATENT DOCUMENTS

EP   0 067 111 A2   12/1982
EP   0602989   * 12/1993   ............. B60C 11/04
(Continued)

OTHER PUBLICATIONS

International Search Report dated Jun. 11, 2018, in corresponding PCT/FR2018/051046 (6 pages).

*Primary Examiner* — Matthew J Daniels
*Assistant Examiner* — Shibin Liang
(74) *Attorney, Agent, or Firm* — Venable LLP

(57) ABSTRACT

A tire (1) for a vehicle has a tread surface having a transverse radius RT and comprises a crown layer (3) that comprises at least one undulation (312) in line with a rib (26). The undulation (312) is such that it is radially on the outside of the points of the undulated layer in line with the center of the bottom face of the circumferential furrow (25) closest to the undulation (312) and has an amplitude at least equal to 1

(Continued)

mm. The radial distance (da) between at least one contact edge corner of a rib (26) in line with which an undulation is located and the transverse radius RT of the rib is at least equal to 0.2 mm and at most equal to 2 mm.

19 Claims, 4 Drawing Sheets

(56) References Cited

U.S. PATENT DOCUMENTS

| | | | |
|---|---|---|---|
| 4,381,810 A | 5/1983 | Cady et al. | |
| 5,201,970 A * | 4/1993 | Jefferson | B60C 9/20 |
| | | | 152/526 |
| 10,821,779 B2 * | 11/2020 | Yamaguchi | B60C 11/01 |
| 2014/0326377 A1 | 11/2014 | Abad et al. | |
| 2016/0272011 A1 * | 9/2016 | Onabe | B60C 11/1392 |
| 2016/0311258 A1 | 10/2016 | Abad et al. | |
| 2018/0029417 A1 * | 2/2018 | Nagai | B60C 1/0008 |
| 2018/0215204 A1 * | 8/2018 | Kuriyama | B60C 11/01 |

FOREIGN PATENT DOCUMENTS

| | | | | |
|---|---|---|---|---|
| FR | 2984230 A1 | 6/2013 | | |
| FR | 3014442 A1 | 6/2015 | | |
| JP | 2011-31841 A | 2/2011 | | |
| JP | 2011031841 | * | 3/2011 | B60C 9/18 |
| WO | 2016/139005 A1 | 9/2016 | | |

* cited by examiner

TIRE COMPRISING OPTIMIZED ARCHITECTURE AND TREAD PATTERN

FIELD OF THE INVENTION

The present invention relates to a tyre intended to be fitted to a vehicle, and more particularly to the crown of such a tyre.

Since a tyre has a geometry that exhibits symmetry of revolution about an axis of rotation, the geometry of the tyre is generally described in a meridian plane containing the axis of rotation of the tyre. For a given meridian plane, the radial, axial and circumferential directions denote the directions perpendicular to the axis of rotation of the tyre, parallel to the axis of rotation of the tyre and perpendicular to the meridian plane, respectively. The circumferential median plane referred to as the equatorial plane divides the tyre into two substantially symmetrical half-torus shapes, it being possible for the tyre to exhibit asymmetries of the tread, of architecture, which are connected with the manufacturing precision or with the sizing.

In the following text, the expressions "radially on the inside of" and "radially on the outside of" mean "closer to the axis of rotation of the tyre, in the radial direction, than" and "further away from the axis of rotation of the tyre, in the radial direction, than", respectively. The expressions "axially on the inside of" and "axially on the outside of" mean "closer to the equatorial plane, in the axial direction, than" and "further away from the equatorial plane, in the axial direction, than", respectively. A "radial distance" is a distance with respect to the axis of rotation of the tyre and an "axial distance" is a distance with respect to the equatorial plane of the tyre. A "radial thickness" is measured in the radial direction and an "axial width" is measured in the axial direction.

In the following text, the expression "in line with" means "for each meridian, radially on the inside within the boundaries of the axial coordinates delimited by". Thus, "the points of a working layer that are in line with a furrow" denote, for each meridian, the collection of points in the working layer that are radially on the inside of the furrow within the boundaries of the axial coordinates delimited by the furrow.

A tyre comprises a crown comprising a tread that is intended to come into contact with the ground via a tread surface, two beads that are intended to come into contact with a rim, and two sidewalls that connect the crown to the beads. Furthermore, a tyre comprises a carcass reinforcement, comprising at least one carcass layer that is radially on the inside of the crown and connects the two beads.

The tread of a tyre is delimited, in the radial direction, by two circumferential surfaces of which the radially outermost is the tread surface and of which the radially innermost is referred to as the tread pattern bottom surface. The tread pattern bottom surface, or bottom surface, is defined as being the surface of the tread surface translated radially inwards by a radial distance equal to the tread pattern depth. It is commonplace for this depth to be degressive over the axially outermost circumferential portions, referred to as the shoulders, of the tread.

In addition, the tread of a tyre is delimited, in the axial direction, by two lateral surfaces. The tread is also made up of one or more rubber compounds. The expression "rubber compound" denotes a composition of rubber comprising at least an elastomer and a filler.

The crown comprises at least one crown reinforcement radially on the inside of the tread. The crown reinforcement comprises at least one working reinforcement comprising at least one working layer made up of mutually parallel reinforcing elements that form an angle of between 15° and 50° with the circumferential direction. The crown reinforcement may also comprise a hoop reinforcement comprising at least one hooping layer made up of reinforcing elements that form an angle of between 0° and 10° with the circumferential direction, the hoop reinforcement usually, but not necessarily, being radially on the outside of the working layers.

For any layer of reinforcing elements of a crown, working or other reinforcement, a continuous surface, referred to as the radially outer surface (ROS) of said layer, passes through the radially outermost point of each reinforcing element, of each meridian. For any layer of reinforcing elements of a crown, working or other reinforcement, a continuous surface, referred to as the radially inner surface (RIS) of said layer, passes through the radially innermost point of each reinforcing element, of each meridian. The radial distances between a layer of reinforcing elements and any other point are measured from one or the other of these surfaces and in such a way as not to incorporate the radial thickness of said layer. If the other measurement point is radially on the outside of the layer of reinforcing elements, the radial distance is measured from the radially outer surface ROS to this point, and, respectively, from the radially inner surface RIS to the other measurement point if the latter is radially on the inside of the particular layer of reinforcing elements. This makes it possible to consider radial distances that are coherent from one meridian to the other, without it being necessary to take into account possible local variations associated with the shapes of the sections of the reinforcing elements of the layers.

In order to obtain good grip on wet ground, cuts are made in the tread. A cut denotes either a well, or a groove, or a sipe, or a circumferential furrow, and forms a space opening onto the tread surface.

A sipe or a groove has, on the tread surface, two characteristic main dimensions: a width W and a length Lo, such that the length Lo is at least equal to twice the width W. A sipe or a groove is therefore delimited by at least two main lateral faces that determine its length Lo and are connected by a bottom face, the two main lateral faces being at a non-zero distance from one another, referred to as the width W of the sipe or of the groove.

The depth of the cut is the maximum radial distance between the tread surface and the bottom of the cut. The maximum value for the depths of the cuts is referred to as the tread pattern depth.

A furrow is a groove that is substantially circumferential, and the lateral faces are substantially circumferential in the sense that their orientation can vary locally around plus or minus 45° about the circumferential direction, but that all of the patterns that belong to the furrow can be found all around the tread, forming a substantially continuous set, i.e. one that exhibits discontinuities representing less than 10% by length compared with the length of the patterns.

The circumferential furrows delimit ribs. A rib is made up of the tread pattern elements included between an axial edge of the tyre and an adjacent axially outermost circumferential furrow for the axially outermost ribs, or included between two adjacent circumferential furrows.

PRIOR ART

A tyre needs to meet numerous performance criteria relating to phenomena such as wear, grip on various types of ground, rolling resistance and dynamic behaviour. These performance criteria sometimes lead to solutions that compromise other criteria. Thus, for good grip, the rubber material of the tread needs to be dissipative and soft. In contrast, in order to obtain a tyre that performs well in terms of behaviour, notably in terms of dynamic response to transverse loading of the vehicle and therefore loading chiefly along the axis of the tyre, the tyre needs to have a sufficiently high level of stiffness, notably under transverse load. For a given size, the stiffness of the tyre depends on the stiffness of the various elements of the tyre that are the tread, the crown reinforcement, the sidewalls and the beads. The tread is traditionally stiffened either by stiffening the rubber materials, or by reducing the depth of the tread pattern or by reducing the groove-to-rubber ratio of the tread pattern.

In order to alleviate the problem, tyre manufacturers have, for example, changed the rubber material by stiffening it notably using fibres, as mentioned in the documents FR 3 014 442 and FR 2 984 230.

These solutions are not always satisfactory. Reducing the tread pattern depth limits the performance in terms of wear and in terms of wet grip. Stiffening the rubber material limits the wet and dry grip capabilities and also increases the tyre noise during running. Reducing the void volume of the tread pattern reduces the wet grip capabilities, particularly when there is a great depth of standing water. It is also important to maintain a certain thickness of rubber materials between the bottom face of the cuts, grooves or furrows and the reinforcing elements of the radially outermost crown reinforcement, in order to ensure the endurance of the tyre.

SUMMARY OF THE INVENTION

The main objective of the present invention is to enhance the performance of the tyre in terms of behaviour by improving its performance in terms of grip, and more particularly in terms of dry grip, in terms of wet grip, and in terms of rolling resistance without altering its performance in terms of wearing and crown durability.

This objective is achieved by a tyre comprising:
a tread intended to come into contact with the ground via a tread surface, of axial width LSR, and a tread surface away from the shoulder, centred on the median circumferential plane of the tyre and having an axial width LSR' equal to 80% of the axial width LSR of the tread surface,
the tread surface away from the shoulder comprising grooves, the grooves forming a space that opens onto the tread surface and being delimited by at least two main lateral faces connected by a bottom face,
at least one groove in the tread surface away from the shoulder being substantially circumferential, being referred to as a circumferential furrow having a width W, defined by the distance between the two lateral faces, at least equal to 5 mm, and a depth D, defined by the maximum radial distance between the tread surface and the bottom face, at least equal to 4 mm,
at least two ribs on the tread surface away from the shoulder, each having at least one contact edge corner defined as the intersection between the rib and the lateral face of the circumferential furrow delimiting the rib,
each rib on the tread surface away from the shoulder having, in each meridian plane of the tyre, a transverse radius RT,
the tyre also comprising a crown reinforcement, radially on the inside of the tread, comprising a working reinforcement,
the working reinforcement comprising at least one working layer,
each layer of the crown reinforcement extending radially from a radially inner surface (RIS) to a radially outer surface (ROS),
at least one working layer comprising reinforcing elements which are continuous from one axially outer edge of the working layer to the opposite axially outer edge, are at least partially made of metal coated in an elastomer material, are mutually parallel and form with the circumferential direction (XX') of the tyre an oriented angle of which the absolute value is at least equal to 15° and at most equal to 50°,
a carcass reinforcement radially on the inside of the crown reinforcement,
at least one layer, referred to as undulated layer, of the crown reinforcement comprising, in line with a rib, at least one undulation, said layer of the crown reinforcement comprising reinforcing elements, from one axially outer edge of the layer of the crown reinforcement to the opposite axially outer edge,
the at least one undulation in the radially outermost undulated layer being such that the radially outermost undulated layer portion of the undulation is radially on the outside of the points of the radially outermost undulated layer that are in line with the centre of the bottom face of the furrow closest to said undulation,
the at least one undulation in the radially outermost undulated layer being such that, in line with the rib where an undulation is located, the minimum radial distance (do) between the radially outer surface (ROS) of the radially outermost undulated layer and the radially outermost point of the rib is at least 1 mm less than the radial distance (dc) between the radially outer surface (ROS) of the radially outermost undulated layer and the radially outermost point of the rib, which is the distance in line with the furrow closest to the undulation in question,
the radial distance (da) between at least one contact edge corner of a rib in line with which an undulation is located, and the transverse radius RT of the rib in question away from the shoulder being at least equal to 0.2 mm and at most equal to 2 mm, preferably at least equal to 0.5 mm and at most equal to 1.5 mm, more preferably at least equal to 0.8 mm and at most equal to 1.2 mm,
the radial distance (d1) between the radially outer surface (ROS) of the radially outermost working layer and the bottom face of the circumferential furrows being at least equal to 1 mm and at most equal to 6 mm, preferably at least equal to 2 mm and at most equal to 4 mm.

In order to improve the dynamic response under axial load, the tyre therefore needs to be stiffened in its axial component, which, in the case of the crown reinforcement, is essentially caused by the stiffness of the metal working layers and the distance between these and the tread surface. Specifically, the metal working layers are rigid in tension and in compression on account of their materials. They are also rigid in shear on account of the angles they make with the circumferential direction and the fact that they are coupled by the thin thickness of rubber materials between them.

By contrast, the materials between the working layers and the tread surface work in shear under transverse load. The greater the radial thickness of these materials, the less stiff this part of the crown is, and the greater the extent to which the dynamic response performance under axial load is diminished. Therefore, it is necessary to reduce this distance. However, it is necessary to maintain the tread pattern depth and thus the depths D of the grooves and furrows in order to preserve the performance in terms of wearing and wet grip of the tyre.

Moreover, it is necessary to preserve the radial distance (d1), referred to as the beneath-void depth, between the radially outer surface (ROS) of the radially outermost working layer and the bottom face of the circumferential furrow, in order to protect the reinforcing elements of the various crown layers from puncturing. One solution to this problem is to leave unchanged the tread pattern depth and the depths D of the grooves and the furrows and the beneath-void depth (d1), which are measured in line with the major grooves and with the furrows, and to reduce the radial distance (do) between the radially outermost layer of the crown reinforcement in line with the ribs.

Given that the tread surface of a tyre is substantially cylindrical, this solution amounts to radially undulating the radially outermost layer of the crown reinforcement, or some or all of the layers of the crown reinforcement, or these and some or all of the layers of the carcass reinforcement, according to axial undulations. If one layer of reinforcing elements has an undulation, according to the invention, all of the layers that are radially on the outside thereof and are continuous from one axial edge of the crown reinforcement to the other have an undulation.

This solution goes against methods of tyre manufacture for which the working layers are laid on substantially cylindrical forms, with a circular base and a generatrix that is a straight line perpendicular to the base. Tyres of the prior art exhibit, after curing, in the meridian planes, a regular curvature of the working layers, without a point of inflection or one that is highly localized to the rubber at the edge over less than 10% of the axial width of the working layer in question.

Specifically, it is common practice to uncouple certain layers very locally at the ends of the reinforcing elements that form them. These layers are laid at a substantially constant radius. In the case of the tyres according to the invention, these layers are arranged with variations in radius over a minimal surface area in order to provide the expected advantages and exhibit at least one point of inflection in the meridian plane.

Having undulations that are arranged axially is the method which, using the current type of manufacturing tool, is least expensive in terms of cycle time or in terms of tool modification. Specifically, all that is needed is either to modify the generatrix of the cylindrical form used for laying the carcass and crown reinforcements, or to lay circumferential elements of padding rubber.

Moreover, undulating the layers of reinforcing elements subjected to compressive loadings may appear to make the tyre more sensitive to variations in the geometry of the tread surface, impairing performance aspects such as uneven wear resistance, out-of-balance, etc. Nevertheless, the solution yields very good performance against these criteria.

In addition, undulating the layers of reinforcing elements subjected to compressive loadings goes against the recommendations for combating the buckling of the structures. Specifically, creating a discontinuity in a radius of curvature amounts to creating additional stresses where buckling may occur. However, in the tyre, the loadings are very highly localized, which means that part of the crown is in tension when another part is in compression, on a scale that is very much smaller than that of the undulations. Thus, the undulations made within the limits of the invention do not detract from the endurance of the tyre.

In order to avoid any problem of crown endurance associated with impacts as the tyre runs along a road exhibiting an obstacle, or associated with the fatigue of the rubber material at the end of the reinforcing elements, it is important that the reinforcing elements of the working layer be continuous from one axially outer edge of the working layer to the opposite axially outer edge. The reinforcing elements of the working layer comprise one or more braided or unbraided metal threads. It is important that these threads be very predominantly continuous across the entire width of the working layer so that the working layer is itself continuous.

In order to create further axial stiffness, if only one hooping layer is undulated, this will be continuous from one axially outer edge of the layer of the crown reinforcement to the opposite axially outer edge.

Experience shows that, in order to improve the performance in terms of dynamic behaviour under transverse load, one of the criteria which is sufficient in itself is to decrease the distance (do) between the radially outer surface (ROS) of the radially outermost undulated layer and the tread surface, namely the radially outermost point of the rib. This makes it possible to reduce the sheared thicknesses of rubber materials of the tread and to reduce the production of heat caused by the hysteresis of these materials. These effects are beneficial both with regard to the stiffness of the tread, which is dependent on temperature, and with regard to the performance in terms of rolling resistance and endurance. Undulating at least one layer of the crown reinforcement additionally makes it possible to increase the axial stiffness of the tyres by increasing the flexural inertia on the edge of the crown, this resulting in an appreciable improvement in behavioural performance. Moreover, in some tyres, the crown comprises only one working layer, and the invention also works in such cases.

This distance (do) is decreased by creating at least one undulation in a layer of the crown reinforcement, such that this undulation or undulated part of the layer of the crown reinforcement is radially on the outside of the part of the working layer that is in line with the circumferential furrow closest to said undulation. It is not a matter of considering as being undulated a layer of the crown reinforcement that is not undulated but meets the criterion for reducing the distance (do) through a decrease in the tread pattern depth in a given zone. This feature is moreover known notably for tyres for passenger vehicles having a tread pattern depth that is smaller on the axially outer edges, known as shoulders, of the tyre than in the closest furrows. In tyres according to the prior art, in the part at the shoulders where the radial distance (do) decreases, the working layer is either at a constant distance from the axis of the tyre or radially on the inside of those parts of the same working layer that are in line with the closest circumferential furrow.

In order to alleviate this problem, consideration is given only to the part of the crown and of the tread away from the shoulder and the tread surface away from the shoulder, that is to say which is included on either side of the equatorial plane of the tyre and represents 80% of the axial width of the tread and of the tread surface, respectively.

The invention also works if one or more undulations are positioned in one or more parts of one or more shoulders of the tyre.

The beneath-void distance (d1) needs to be maintained in the major grooves and the circumferential furrows. The minor grooves or the sipes are less sensitive to puncturing and to attack from obstacles because they are protected by the rubber material that technically characterizes them as being shallow or narrow grooves.

For optimum performance in terms of puncturing and attack of the crown, without penalizing the rolling resistance, the radial distance (d1) between the radially outer surface (ROS) of the radially outermost working layer and the bottom face of the circumferential furrows is at least equal to 1 mm and at most equal to 6 mm, preferably at least equal to 2 mm and at most equal to 4 mm. Below the lower limits, the tyre may prove too sensitive to attack. Above the upper limits, the rolling resistance of the tyre would be penalized.

The layers with a low stiffness, by comparison with the working layers, such as the protective layers, which may or may not be metallic, the hooping layers, which contain reinforcing elements that make an angle B at most equal, in terms of absolute value, to 10° with the circumferential direction (XX') of the tyre, do not have sufficiently high compression stiffness and shear stiffness, because of their materials, which are sometimes textile, and because of the angles at which they are laid, for undulating these layers alone to provide a solution to the problem that has the same level of effectiveness as undulating a working layer does.

Admittedly, such a crown layer does not, on account of its orientation and the material of the reinforcing elements of which it is made, have the axial stiffness of a working layer, but this axial stiffness is greater than that of the materials of the tread. Therefore, a tyre in which the radial distance do between the hooping layer or protective layer, measured in line with the major grooves and the furrows, and the tread surface (or the radially outermost point of the rib in question) is less than the radial distance dc between the hooping layer, or protective layer, respectively, and the tread surface (or the radially outermost point of the rib in question) in line with the ribs has improved axial stiffness. This is therefore one possibility of the invention, even though simply undulating the hooping layer or protective layer without undulating the radially outermost working layer is less advantageous in terms of result than the configuration in which at least one of the working layers is undulated.

These protective or hooping layers are optional in a tyre and do not govern the benefit of the solution. Since these layers of the crown reinforcement are generally radially on the outside of the working layers, undulating a working layer means, according to the invention, undulating the hooping or protective layers, if the latter are continuous from one axial edge of the undulation to the other.

It would appear that undulating a layer of the crown reinforcement and preferably a working layer, in line with just one rib, for example a rib that is central and symmetric with respect to the median circumferential plane, is enough to bring about a measurable improvement in dynamic performance under transverse load. This solution may have an advantage in terms of irregular wear, or in terms of axial thrust value depending on the direction of the thrust depending on the camber angle of the vehicle. Nevertheless, this single undulation may equally be situated under any rib and notably under one of the radially outermost ribs. Such choices may be made by taking account of the directional or axisymmetric aspect of the tyres and of the camber angle of the vehicle for which the tyre is intended.

The amplitude of this undulation needs to be at least equal to 1 mm in order to have significant effects at tyre level, and so the radial distance (do) between the radially outer surface (ROS) of the radially outermost undulated layer and the radially outermost point of the rib is at least 1 mm less than the radial distance (dc) between the radially outer surface (ROS) of the radially outermost undulated layer and the radially outermost point of the rib, which is the distance in line with the centre of the bottom face of the circumferential furrow closest to said undulation.

Such a solution brings about a modification in the distribution of the pressures in the contact patch, resulting:
in the occurrence of hissing noise on sealed ground, poorly draining ground, which evacuates little rainwater, if any,
in a reduction in performance in terms of grip on wet smooth ground,
in more rapid wearing of the edges of the ribs in line with which an undulation is located, resulting in shortening of the life in terms of wear of the solution compared with optimum wear.

According to the prior art, the points of the tread surface of a rib in a meridian, give or take manufacturing variations, follow a transverse radius RT substantially parallel to that of the layers of the crown reinforcement. Without undulation, a rib is squashed uniformly in the contact patch, each point of the rib being at an equal distance from the layers of the crown reinforcement. For an inflated tyre—namely having an internal pressure at least equal to 1.1 bar—under the effect of meridian tension brought about by inflation, the layers of undulated reinforcing elements are under tensile loading. Under this load, the undulation loses amplitude. The radially outermost points of these layers move radially towards the axis of rotation of the tyre by a distance relative to the amplitude of the undulation. Subsequently, the points of the tread surface radially above the radially outermost points of the undulated layers likewise move in the same direction. Conversely, the radially innermost points of the undulated layers, in line with the furrows and thus with the lateral faces of the ribs, are made to move radially in the opposite direction, away from the axis of rotation of the tyre. Thus, the areas around the radially outermost points of the ribs undergo, under the effect of the internal pressure of the tyre, a decrease in axial radius with respect to the lateral faces of the ribs. As a result of these movements that are specific to the inflation of tyres having an undulated crown, the flattening of the ribs is not uniform and therefore the rates of wearing are different between the centre and the edge of the ribs.

In order to avoid this reduction in wearing life of the ribs, the solution consists in radially offsetting the lateral faces of the ribs, and notably the contact edge corners thereof at a radius smaller than the transverse radius RT of the rib. The greater the amplitude of the undulation in the crown, the greater the relative movements, and the more it is necessary to compensate for the relative movements of the radially outermost points of the ribs and of the lateral faces of the ribs. For undulations with an amplitude close to 1 mm, the optimal radial distance between a contact edge corner defined as the intersection between the rib and the lateral face of the circumferential furrow and the transverse radius RT of the rib in question is at least equal to 0.2 mm and at most equal to 0.8 mm; for undulations with amplitudes close to 2.5 mm, this optimal radial distance is preferably at least equal to 0.5 mm and at most equal to 1.5 mm; for undulations with an amplitude close to 5 mm, this optimal radial distance is more preferably at least equal to 1.2 mm and at most equal to 2 mm. One and the same tyre can, in order to meet certain demands of its specification sheet, have undulations in one and the same layer of reinforcing elements that have different amplitudes and therefore different optimal radial distances between the contact edge corners of the ribs and the transverse radius RT of the ribs.

Since the tread surface of the ribs in line with which an undulation is located is domed on account of the geometry of their contact edge faces, the distances between the tread surface and the layers of the crown reinforcement are measured from the radially outermost point of the rib in question. The depth of the furrows is measured using conventional tools from these same points—the radially outermost points of the ribs in line with which an undulation is located. This is because these tools are designed such that they avoid the rib edge effects thus described.

This characteristic for a contact edge corner of a rib, of a non-zero radial distance from the axis of rotation of the tyre that is less than the radius RT of the rib, makes it possible to improve the performance in terms of life; nevertheless, the invention is all the more effective if all the contact edge corners of the ribs in line with which an undulation of at least one layer of the crown reinforcement is located have this characteristic. This characteristic may be identical for all of the ribs or depend on the characteristics of the different undulations of the layers of the crown reinforcement in line with the different ribs.

This characteristic for a contact edge corner of a rib, of a non-zero radial distance from the axis of rotation of the tyre that is less than the radius RT of the rib, is measured on an unconstrained tyre, which is not mounted on a rim and not inflated.

The joining curve between the contact edge corner of the rib and the transverse radius RT of the rib may take different forms. The preferred form is a continuously variable curve (spline), which, on account of its continuity, will allow the wear to be regulated optimally in this area of the rib. It is also preferred to join the contact edge corner to the transverse radius RT of the rib:
- by rounded portions having a radius at least equal to 2 mm and at most equal to 8 mm
- by chamfers that form an angle with the RT at least equal to 10° and at most equal to 45° along an axial length at least equal to 2 and at most equal to 10 mm
- by a curve that is linear in sections.

It should be noted that this type of design of the contact edge corners in tyres that are not provided with undulations causes irregular wearing of the ribs with greater wear at the centre of the ribs than at the edges.

Preferably, in line with at least one rib on the tread surface where an undulation is located, the minimum radial distance (do) between the radially outer surface (ROS) of the radially outermost undulated layer and the radially outermost point of the rib in question is at least 1.5 mm, and preferably 2 mm, less than the radial distance (dc) between the radially outer surface of the radially outermost undulated layer and the radially outermost point of the rib in question, which is the distance in line with the circumferential furrow closest to the undulation in question. The design parameters that make it possible to regulate the dynamic response under significant transverse load, representing at least around 50% of the nominal tyre load, are:
- The number of ribs and the number and radial dimension of the undulations of the radially outermost working layer. The greater the axial extent of the undulation, the stiffer the tyre under transverse load, and the better its performance in terms of rolling resistance. A single rib may represent 15% of the axial width of the radially outermost working layer. It is commonplace to have 3, 4 or 5 ribs and for the furrows to represent around 20% of this width.
- The amplitude of the undulation is at least equal to 1 mm, but limited to 5 mm because of the radii of curvature to be imparted on the metal working layers, which are stiff and therefore not very deformable.

Therefore, a preferred solution is that, in line with at least one rib on the tread surface where an undulation is located, the radial distance (do) between the radially outer surface (ROS) of the radially outermost undulated layer and the radially outermost point of the rib in question is at most 5 mm, and preferably at most 3 mm, less of the rib than the radial distance (dc) between the radially outer surface (ROS) of the radially outermost undulated layer and the radially outermost point of the rib in question, which is the distance in line with the circumferential furrow closest to the undulation in question.

It is advantageous for an undulation of the undulated layer and preferably of the radially outermost working layer to be present in line with all the ribs on the tread surface in order to extend the advantage of the solution to its best.

One preferred solution is for an undulation of the undulated layer and preferably of the radially outermost working layer to be present only in line with the ribs on the tread surface that are axially closest to the median circumferential plane, on either side of this plane, in order to obtain just enough of a performance advantage with respect to the increase in manufacturing cost that undulating the radially outermost working layer represents.

It is advantageous for the tread, for example in a groove or a circumferential furrow of the tread, to comprise at least one wear indicator, and for the minimum radial distance (du) between the radially outer surface (ROS) of the radially outermost layer of the crown reinforcement and the radially outermost point of the rib in question to be at least equal to the radial distance (df) between the tread surface and the radially outermost point of the wear indicator. Specifically, it is important for the user to be able to perceive that the tyre is worn, using the wear indicator, and to be able to do so before the reinforcing elements of the radially outermost layer of the crown reinforcement begin to appear on the tread surface. The latter is not necessarily undulated if it is discontinuous and laid only under the ribs and not under the furrows.

Advantageously, the minimum radial distance (du) between the radially outer surface (ROS) of the radially outermost layer of the crown reinforcement and the tread surface is at most equal to the depth D of the closest circumferential furrow plus 4 mm, and at least equal to the depth D of the closest circumferential furrow minus 2 mm. This solution allows ideal positioning of the radially outermost layer of reinforcing elements of the crown reinforcement with respect to the tread surface. The latter is not necessarily undulated if it is discontinuous and laid only under the ribs and not under the furrows. The minimum radial distance (du) between the radially outer surface (ROS) of the radially outermost layer of the crown reinforcement and the tread surface has to be measured over the radially outer portion of the crown reinforcement, and therefore at an undulation.

Preferably, the depth D of a major groove or of a circumferential furrow is at least equal to 4 mm and at most equal to 20 mm. Tread pattern depths at least equal to 4 mm and at most equal to 9 mm, preferably at least equal to 6 mm and at most equal to 8 mm, allow a good compromise between the performance in terms of wearing and in terms of rolling resistance in many passenger vehicle tyres. Tread pattern depths at least equal to 8 mm and at most equal to 20 mm are attractive for the same compromises in tyres for vehicles that carry heavy loads. The invention is not limited to tyres for a particular use.

Advantageously, at the radius of the axially outermost point of the tyre, the axial distance dg between the axially innermost layer of reinforcers and the axially innermost point with respect to this radius is at most equal to 7 mm, preferably at most equal to 4 mm. This distance dg denotes, at the very least, the thickness of the rubber or the other compounds inside the radially innermost carcass layer at the sidewall of the tyre. In particular architectures, this reinforcer layer performs a different function from the carcass layer. These compounds have the function of ensuring the airtightness of the tyre and sometimes of avoiding oxidation of the carcass layer. Some tyres have interior-compound thicknesses greater than 7 mm, notably to allow the tyre to roll at a pressure of zero. This type of tyre is not optimized for the objective of the invention of saving weight and improving rolling resistance.

In instances in which the radially outermost layer of reinforcing elements is a hooping layer, it is advantageous for the radially outermost layer of reinforcing elements of the crown reinforcement to comprise reinforcing elements made of textile, preferably of the aliphatic polyamide or aromatic polyamide type, of a type involving a combination of aliphatic polyamide and aromatic polyamide, of polyethylene terephthalate or of rayon type, which are mutually parallel and form an angle B at most equal to 10°, in terms of absolute value, with the circumferential direction (XX') of the tyre.

A hooping layer containing an aromatic polyamide makes it possible to achieve greater stability of the geometry of the hooping layer and thus of the geometry of the tread surface over time and under the centrifugal forces to which the tyre is subjected as it is used, and thus better control of the wear pattern across the width of the ribs.

One preferred solution is for at least one element of padding rubber, having a radial thickness at least equal to 0.3 mm, to be positioned in line with any undulation of the radially outermost undulated layer. The purpose of this is to allow the layers to undulate during building and curing. It is possible to lay several elements of padding rubber in line with the one or more undulations with different radius values having different properties dependent on the tyre specification sheet. If a single element of padding rubber is laid, its maximum thickness is approximately equal, for a given undulation, to the radial distance between the radially outermost point of the radially outer surface of the radially outermost undulated layer at the undulation and the radially outer surface of the radially outermost undulated layer in line with the centre of the bottom face of the major groove closest to said undulation.

With the tread being made up of a rubber compound, it is advantageous for the element of padding rubber, laid in line with the undulation or undulations, to be a rubber compound that has a dynamic loss tan $\delta 1$, measured at a temperature of 23° C. and under a stress of 0.7 MPa at 10 Hz, at most equal to and preferably 30% less than the dynamic loss tan $\delta 2$ of the rubber material of which the tread is made, measured at a temperature of 23° C. and under a stress of 0.7 MPa at 10 Hz. For a padding material with the same hysteresis, the improvement in terms of rolling resistance is achieved only by the reduction in the shear stress loadings that this material experiences. Because the padding material does not experience the same stresses as the rubber material of which the tread is made, it is possible to modify its characteristics in order to improve the rolling resistance still further. A 30% drop in hysteresis leads to a significantly greater improvement for the invention.

It is preferred for the crown reinforcement to consist of 2 working plies of opposite angles and one hooping layer.

Advantageously, the elements of padding rubber in line with the undulations are radially on the inside of all the working layers of the working reinforcement so that the working layers are at no point uncoupled from the crown by these elements of padding rubber. This arrangement guarantees the crown a high level of transverse stiffness.

In order not to create excessively large radii of curvature in the carcass reinforcement which could locally give rise to buckling because of the compressive loadings to which the carcass reinforcement is subjected, one solution is to arrange the elements of padding rubber in line with the undulations, radially on the outside of the carcass layers that make up the carcass reinforcement. In this configuration, the carcass layer(s) diminish continuously in a meridian plane, from the median circumferential plane to the axial edges of the crown reinforcement.

In order notably to save on material, it is possible to create undulations in all of the crown layers and the carcass reinforcement without an element of padding rubber, notably during curing with the aid of a hard-core mould that is able to create undulations.

BRIEF DESCRIPTION OF THE DRAWINGS

The features and other advantages of the invention will be understood better with the aid of FIGS. 1 to 5, said figures not being drawn to scale but in a simplified manner so as to make it easier to understand the invention:

FIG. 2 also shows the axial width of the tread surface LSR and the axial width of the tread surface away from the shoulder LSR'.

FIG. 4 shows several forms a, b, c, d of connection between the contact edge corners of ribs (26) and the transverse radius RT of the rib in question.

Numerous combinations of arrangements and dimensions of the undulations under the ribs are possible. The figures and the description do not attempt to describe all of these explicitly.

DETAILED DESCRIPTION OF THE DRAWINGS

Figure 1:
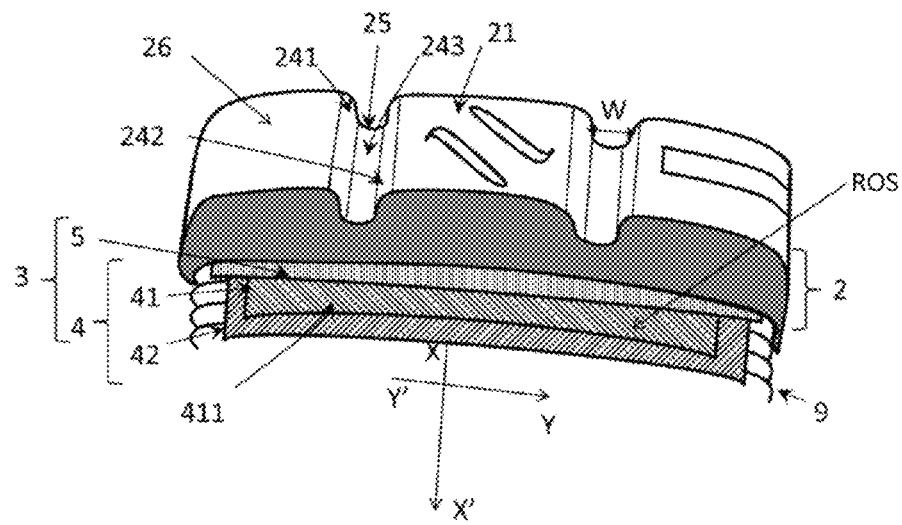
FIG. 1 is part of a tyre, particularly the architecture, the tread (2) and a circumferential furrow (25) and a rib (26) thereof.

FIG. 1 shows a perspective view of a part of the crown of a tyre. A Cartesian frame of reference (XX', YY', ZZ') is associated with each meridian plane. The tyre has a tread 2 which is intended to come into contact with the ground via a tread surface 21. Arranged in the tread are grooves and circumferential furrows 25 of width W possibly differing from one furrow to another, each having main profiles 241 and 242 and a bottom face 243. The tyre also comprises a carcass reinforcement 9, made up in this case of a carcass layer (9), a crown reinforcement 3 comprising a working reinforcement 4 and here, for example, a hoop reinforcement 5. The working reinforcement comprises at least one working layer and here, for example, two working layers 41 and 42, each comprising mutually parallel reinforcing elements. The radially outer surface ROS of the radially outermost working layer 41 is also shown.

Figure 2:
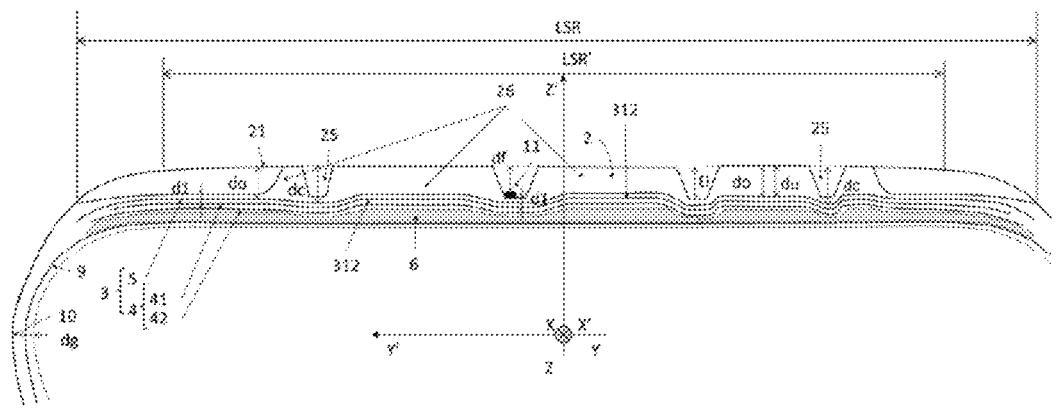
FIG. 2 shows a meridian section through the crown of a tyre according to the invention, with an undulation (312) under a rib (26), and illustrates the various radial distances do, d1, D, du, dc, dg, df and an element of padding rubber (6) capable of creating at least one undulation (312) in the radially outermost working layer.

FIG. 2 schematically shows a meridian section through the crown of the tyre according to the invention. It illustrates in particular an undulation of the radially outermost working layer 41 and 42 and an element of padding rubber 6 positioned in line with the layer 42. FIG. 2 also illustrates the following radial distances:
- D: the depth of a groove, which is the maximum radial distance between the tread surface 21 and the bottom face 243 of the circumferential furrow 25.
- dc: the radial distance between the radially outer surface ROS of the radially outermost undulated layer (in this case the hooping layer 5) and the radially outermost point of the rib (26), which is the distance in line with the centre of the bottom face 243 of the circumferential groove 25 closest to said undulation 312.
- do: the radial distance between the radially outer surface ROS of the radially outermost undulated layer and the radially outermost point of the rib (26) at the undulation 312.
- du: the minimum radial distance between the radially outer surface (ROS) of the radially outermost layer of the crown reinforcement 3 and the tread surface 21. In this case, do is equal to du.
- d1: the radial distance between the radially outer surface ROS of the radially outermost working layer 41 and the bottom face 243 of the circumferential furrows 25.
- dg: at the radius of the axially outermost point 10 of the tyre, the axial distance between the axially innermost layer of reinforcers (in this case the carcass reinforcement 9) and the axially innermost point with respect to this radius.
- df: the radial distance between the tread surface 21 and the radially outermost point of the wear indicator 11.

Figure 3:
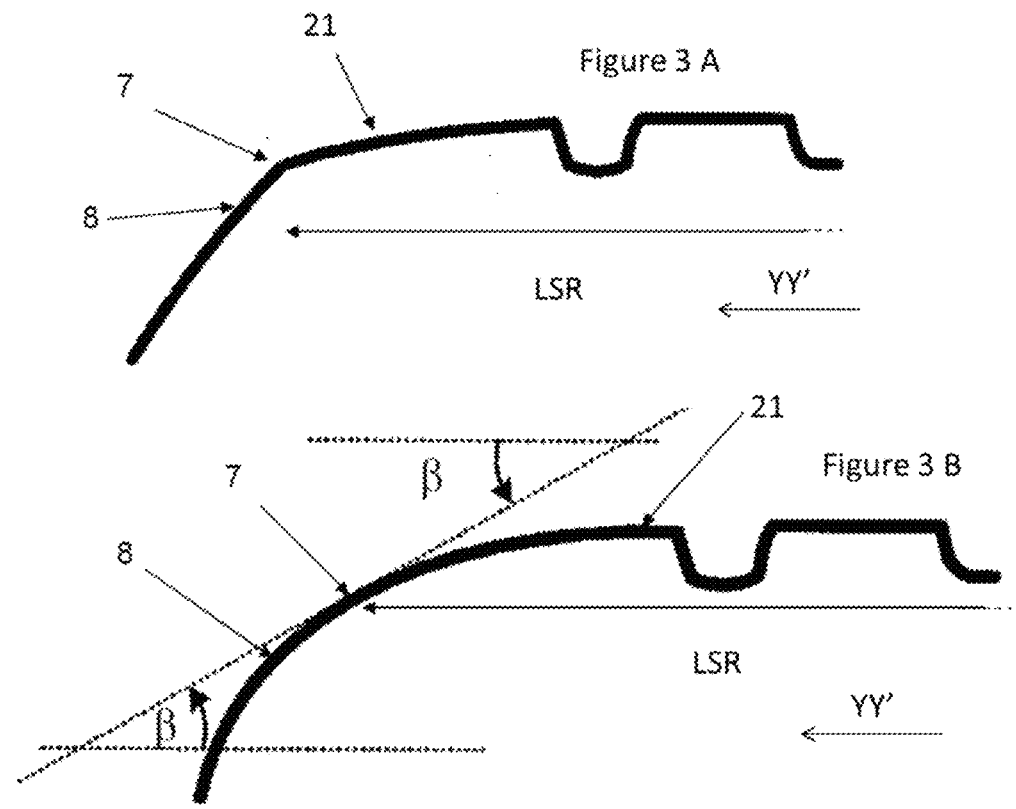
FIGS. 3A and 3B present two types of radially outer meridian profiles of the tread of a passenger vehicle tyre, and the determination of the axial width LSR of the tread surface.

In FIGS. 3A and 3B, the axial edges 7 of the tread, which make it possible to measure the tread surface width LSR, are determined. In FIG. 3A, in which the tread surface 21 intersects the outer axial surface of the tyre 8, the axial edge 7 is determined by a person skilled in the art in a trivial manner. In FIG. 3B, in which the tread surface 21 is continuous with the outer axial surface of the tyre 8, the tangent to the tread surface at any point on said tread surface in the region of transition towards the sidewall is plotted on a meridian section of the tyre. The first axial edge 7 is the point for which the angle β (beta) between said tangent and an axial direction YY' is equal to 30°. When there are several points for which the angle β between said tangent and an axial direction YY' is equal to 30°, it is the radially outermost point that is adopted. The same approach is used to determine the second axial edge of the tread.

Figure 4:
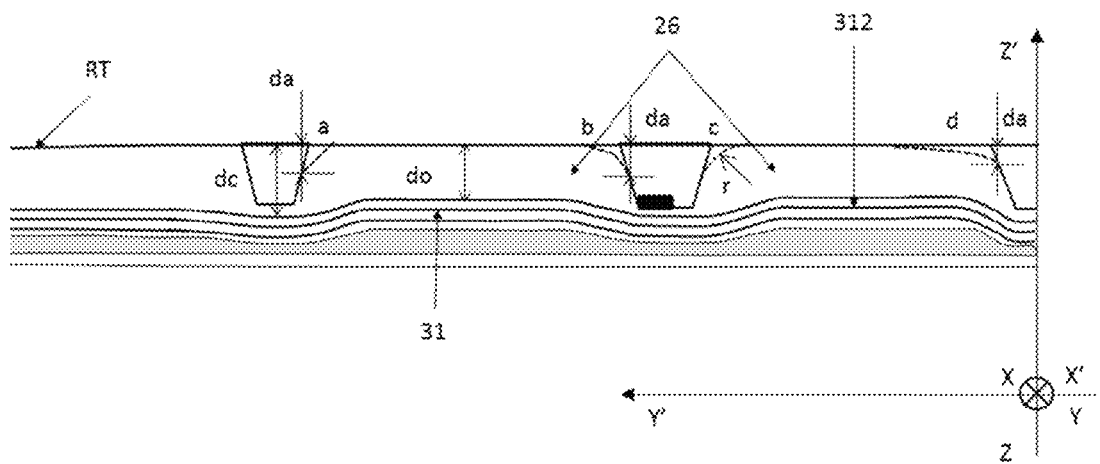
FIG. 4 shows a meridian section through the crown of a tyre according to the invention, with an undulation (312) under 3 ribs (26), and the radial distance da between certain contact edge corners of ribs (26) in line with which an undulation is located, and the transverse radius RT of the rib in question.

FIG. 4 schematically shows a meridian section through the crown of a tyre according to the invention. In a tyre according to the prior art, the crown layers do not contain undulations and the points of a rib on the tread surface away from the shoulder substantially follow the transverse radius RT thereof that a person skilled in the art can determine with the aid of gauges or by taking laser measurements, for example, on the unconstrained tyre. The transverse radius RT of a rib is the radius of a portion of the largest-diameter circle contained in the meridian plane considered to pass through the radially outermost point of the rib in question and the radially outermost points of the two ribs on the tread surface away from the shoulder that are axially closest to the rib in question. For the radially outermost rib, the measurement will be taken with the radially outermost points of the two ribs that are closest but both radially on the inside of the rib in question. For a tyre that has only two ribs, the circle will be taken at a tangent to the tread surface at the radially outermost point of the rib in question.

To avoid wearing problems, the contact edge corners of the ribs are substantially at the radius RT for a tyre according to the prior art which does not meet the particular objective, to the detriment of the performance in terms of wear.

The crown layers shown in FIG. 4 contain undulations and the majority of the points on the tread surface away from the shoulder substantially follow the transverse radii RT of the ribs that a person skilled in the art can determine with the aid of a gauge or by taking laser measurements, for example, on the unconstrained tyre. To avoid wearing problems, the contact edge corners of the ribs are radially on the inside of the radius RT of the rib, at a radial distance da.

The position of the contact edge corner is determined by a person skilled in the art by drawing, on a plot of the outer points of a meridian of the tyre in the unconstrained state or on a meridian section positioned as in the unconstrained state, the tangent to the tread surface at every point of said tread surface in the transition zone between the furrow and the rib, the contact edge corner being the point for which the angle between said tangent and the transverse radius RT is equal to 45°. When there are several points for which said angle is equal to 45°, the point axially farthest from the centre of the rib is used.

FIG. 4 illustrates several manners of connection between the contact edge corner and the transverse radius RT, namely:
- a: by a chamfer
- b: by a curve that is linear in sections
- c: by a rounded portion
- d: by a continuously variable curve (spline).

Figure 5:
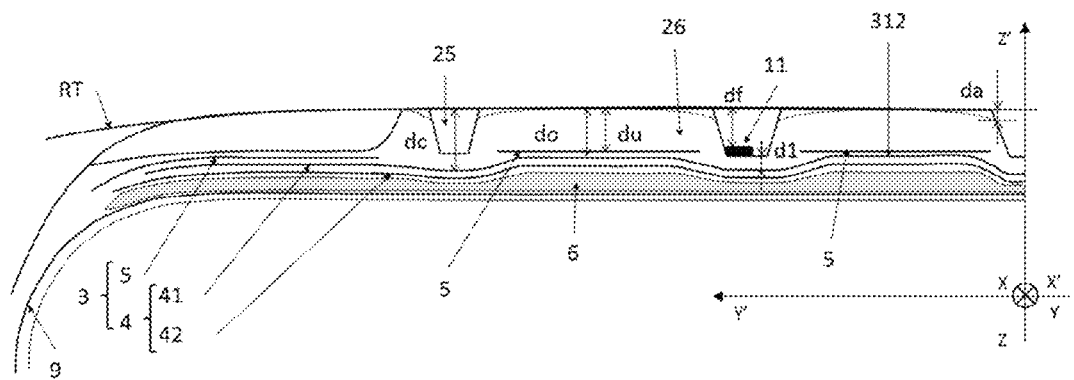
FIG. 5 shows a meridian section through the crown of a tyre according to the invention, with an undulation (312) under the ribs (26), the elements of padding rubber (6) all being radially on the inside of the working layers (41 and 42) and radially on the outside of the carcass layer (9), a hoop (5) being disposed in sections radially on the outside of the radially outermost working layer (41).

FIG. 5 shows a meridian section through the crown of a tyre according to the invention with an undulation under certain ribs (26), a hoop, made up of at least one hooping layer, being disposed in sections radially on the outside of the radially outermost working layer (41) such that, in this case, the radial distance do is not equal to the radial distance du. It is also possible to lay a hoop or a protective layer in two "layers", a first undulated layer, which is continuous from one axial edge of the tyre to the other, and a layer in sections, as illustrated in FIG. 5, which is only present in line with one or more ribs.

Figure 6:
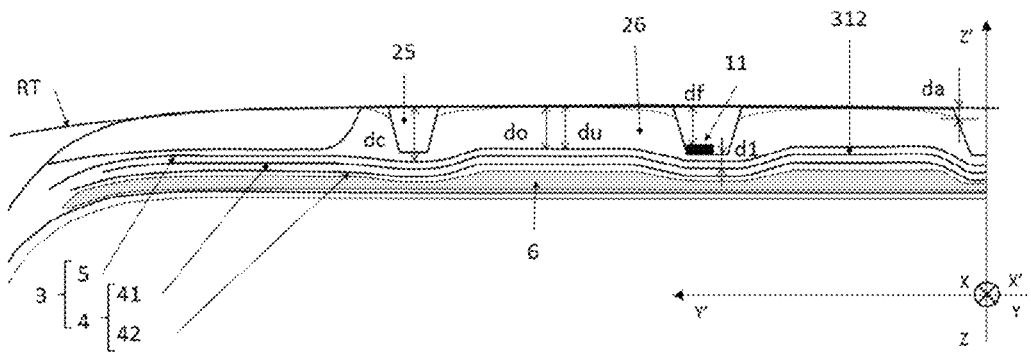
FIG. 6 shows a half-section through a tyre with an optimum solution of the invention. The undulation 312 is present on all of the ribs. The amplitude of the undulation is 2 mm on the central ribs and 1 mm at the shoulders. The distance da is between 0.4 mm and 0.8 mm depending on the ribs in question.
Figure 7:
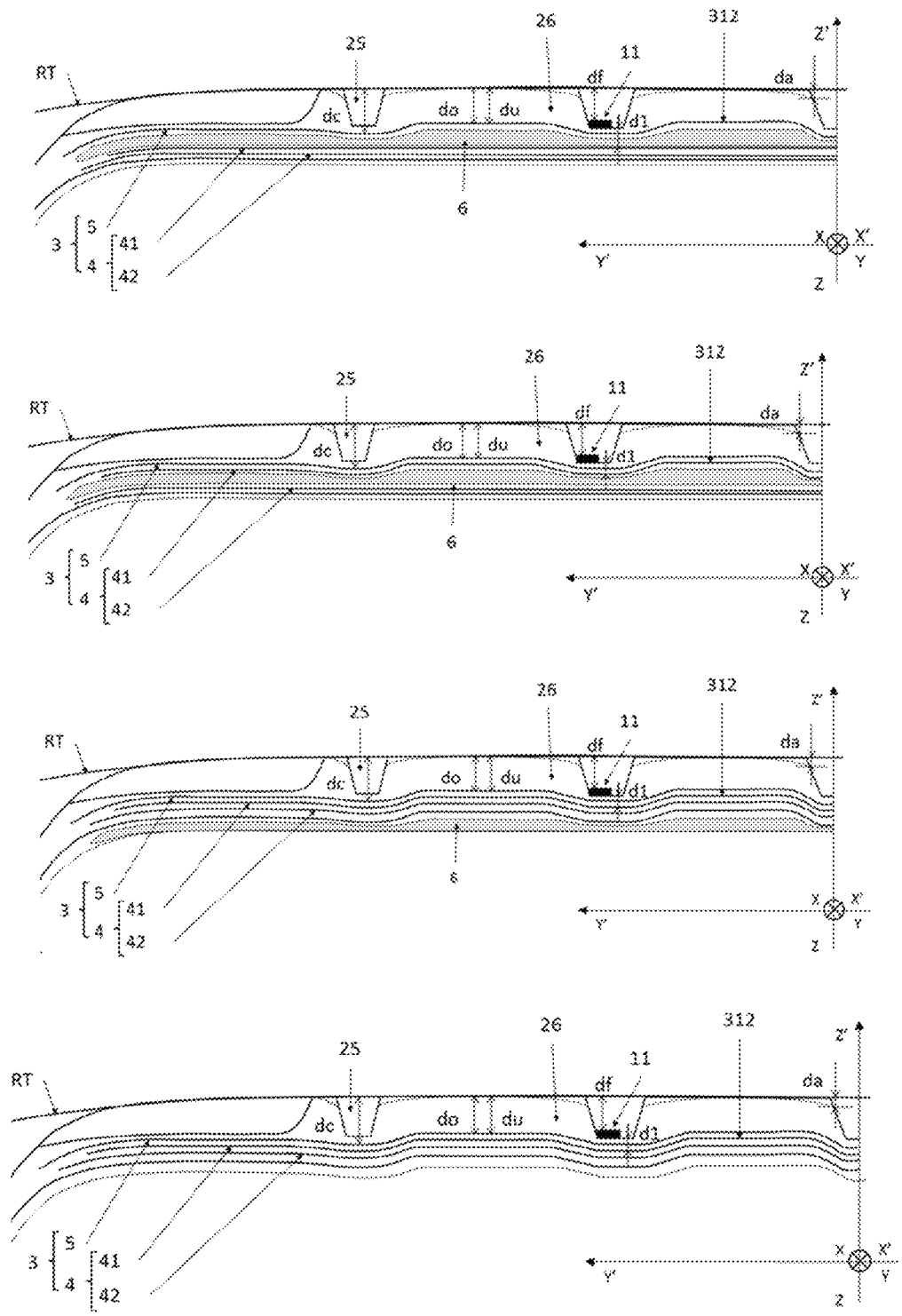
FIG. 7 shows different versions wherein, from top to bottom:
- Only the hooping layer 5 is undulated using elements of padding rubber,
- The working layer 41 and the hooping layer 5 are undulated using elements of padding rubber,
- The carcass layer 9, the working layers 41 and 42 and the hooping layer 5 are undulated using elements of padding rubber,
- The carcass layer 9, the working layers 41 and 42 and the hooping layer 5 are undulated without using elements of padding rubber.

FIG. 6 shows a half-section through a tyre with an optimum solution of the invention. The undulation of the layers (41, 42, 5) is present on all of the ribs.

The amplitude of the undulation on the ribs at the centre is 2 mm (dc−do=2 mm).

The amplitude of the undulation is 1 mm.

The depth D of the main furrows is 7.5 mm.

The distance d1 is between 2.5 mm and 3 mm in line with the main furrows.

The radial distance du is less than D+1.5 mm and is greater than D−2 mm.

The distance du is greater than df.

The distance da is between 0.4 mm and 0.8 mm depending on the ribs in question.

A meridian section through the tyre is obtained by cutting the tyre on two meridian planes. This section is used to determine the various radial distances, the centre of the bottom faces of the grooves and of the furrows.

The invention was carried out on a tyre A of size 305/30 ZR20 intended to be fitted to a passenger vehicle. The depths D of the grooves of the tread pattern are between 4 and 7 mm and equal to 7 mm in the case of the circumferential furrows, for widths W that are variable in the case of the grooves and equal to 15 mm in the case of the furrows. The crown reinforcement is made up of two working layers of which the reinforcing elements make an angle of + or −38° with the circumferential direction and of a hooping layer of which the reinforcing elements make an angle of + or −3° with the circumferential direction. The reinforcing elements of the working layer are continuous metal cords.

At the radius of the axially outermost point 10 of the tyre, the axial distance dg between the axially innermost layer of reinforcers, the carcass layer, and the axially innermost point with respect to this radius is equal to 4 mm for all of the tyres.

The radially outermost working layer is undulated under the 5 ribs of the tread. The radial distance (do) between the radially outer surface (ROS) of the radially outermost undulated layer, in this case a hooping layer (5), and the tread surface is 2 mm less than the radial distance (dc) between the radially outer surface (ROS) of the radially outermost undulated layer and the tread surface, which is the distance in line with the centre of the bottom face (243) of the circumferential furrow (25) closest to the undulation in the case of the 3 axially inner ribs, and 1 mm in the case of the 2 axially innermost ribs. Likewise, the axial width of the undulations is equal to 21 mm in the case of the 3 axially inner ribs and equal to 7 mm in the case of the 2 axially outermost ribs. The radial distance (d1) between the radially outer surface (ROS) of the radially outermost working layer (41) and the bottom face (243) of the circumferential furrows (25) is between 2 mm and 3.5 mm.

All of the ribs are such that their contact edge corners are at a radial distance da equal to 1 mm from the transverse radius RT of the tyre. The connection of the edge corners to the transverse radii of the ribs is made by a continuously variable curve.

The undulations are created using elements of padding rubber laid in line with the 5 ribs of the tread. These elements of padding rubber are radially on the outside of the carcass layer and radially on the inside of the two working layers, thereby ensuring a flat geometry under the crown, an optimal carcass layer geometry and optimal coupling between said working layers.

Tyres A were compared with tyres B of the same size, which have the same characteristics except that the edge corners of the ribs thereof are not adapted to the undulation of the crown as mentioned by the invention, and with tyres C of the same size, which have the same characteristics except that the working layers are not undulated and the contact edge corners are substantially coincident with the transverse radius RT. Tyres A are according to the invention, tyres B are according to an invention that is not optimized, and tyres are according to the prior art.

The padding compound used to create the undulations has a dynamic loss tan δ1, measured at a temperature of 10° C. and under a stress of 0.7 MPa at 10 Hz, 60% less than that of the rubber material of which the tread is made.

The improvement in terms of rolling resistance was evaluated on a standard machine for measurements standardized in accordance with ISO 2850:2009. The tests reveal a more than 10% improvement for tyres A and B compared with the reference tyre C.

Furthermore, a measurement of the characteristic Dz of the Pacejka tyre behaviour model well known to a person skilled in the art reveals a 13% improvement in this characteristic for a pressure of 2.6 b, hot. The improvement in dry grip varies between 1 and 5% depending on the loading conditions for tyres A and B compared with the reference tyre C.

The tyres were also fitted to a sports-type vehicle and tested on a winding circuit capable of generating significant transverse loadings. A professional driver, trained in assessing tyres, compares tyres A according to the invention with tyres B and C according to the prior art and according to a rigorous testing process, under the same temperature conditions and ground running conditions, without knowing the characteristics of the tyres being tested, repeating the measurement. The driver assigns scores to the tyres. In all the tests performed, tyres A according to the invention and B outclass tyres C in terms of vehicle behaviour, roadholding, on dry ground and in terms of grip. Furthermore, the behavioural performance is more constant during a behaviour test on a vehicle fitted with a tyre according to the invention than with a tyre according to the prior art. By contrast, tyres B show:

the occurrence of hissing noise on sealed ground, a drop in grip performance when there is a great depth of standing water on smooth ground, more rapid wearing of the edges of the ribs, leading to a shortening of the wearing life of the solution.

Tyre A preserves the performance aspects of tyre C as regards these performance aspects. The improvement in axial stiffness and the absence of wearing of the ribs also lead to an improvement in wearing of 10% over gentle use on an open road for 10 000 km.

The invention claimed is:

1. A tire for a vehicle comprising:
   a tread intended to come into contact with the ground via a tread surface, of axial width LSR, and having a tread surface away from a shoulder, centered on a median circumferential plane of the tire and having an axial width LSR' equal to 80% of the axial width LSR of the tread surface, the tread surface away from the shoulder comprising grooves, the grooves forming a space that opens onto the tread surface and that is delimited by at least two main lateral faces connected by a bottom face, at least one groove in the tread surface away from the shoulder being substantially circumferential and being a circumferential furrow having a width W, defined by a distance between the at least two main lateral faces, which is at least equal to 5 mm, and a depth D, defined by a maximum radial distance between the tread surface and the bottom face, which is at least equal to 4 mm, and at least two ribs on the tread surface away from the shoulder, each having at least one contact edge corner defined as an intersection between a rib and one main lateral face of the circumferential furrow delimiting the rib;

a crown reinforcement, radially on an inside of the tread, comprising a working reinforcement, the working reinforcement comprising at least one working layer, each layer of the crown reinforcement extending radially from a radially inner surface to a radially outer surface, at least one working layer comprising reinforcing elements which are continuous from one axially outer edge of the working layer to an opposite axially outer edge, are at least partially made of metal coated in an elastomer material, are mutually parallel, and form, with a circumferential direction of the tire, an oriented angle of which an absolute value is at least equal to 15° and at most equal to 50°; and a carcass reinforcement radially on the inside of the crown reinforcement, wherein the crown reinforcement comprises at least one undulated layer, which comprises, in line with a rib, at least one undulation, the at least one undulated layer comprising reinforcing elements, from one axially outer edge of the at least one undulated layer to the opposite axially outer edge, wherein the at least one undulation in a radially outermost undulated layer is such that a radially outermost undulated layer portion of the at least one undulation is radially outside of points of the radially outermost undulated layer that are in line with a center of the bottom face of the furrow closest to the at least one undulation, wherein the at least one undulation in the radially outermost undulated layer is such that, in line with the rib where the at least one undulation is located, a minimum radial distance $d_o$ between a radially outer surface of the radially outermost undulated layer and a radially outermost point of the rib is at least 1 mm less than a radial distance $d_c$ between the radially outer surface of the radially outermost undulated layer and the radially outermost point of the rib, in line with the furrow closest to the at least one undulation, wherein a radial distance $d_a$ between at least one contact edge corner of a rib, in line with which an undulation is located, and a transverse radius of the tread surface away from the shoulder is at least equal to 0.2 mm and at most equal to 2 mm, and wherein a radial distance $d_1$ between the radially outer surface of the radially outermost undulation layer and the bottom face of the circumferential furrows is at least equal to 1 mm and at most equal to 6 mm.

2. The tire according to claim 1, wherein the radial distance $d_1$ is at least equal to 2 mm and at most equal to 4 mm.

3. The tire according to claim 1, wherein the radial distance $d_a$ is at least equal to 0.5 mm and at most equal to 1.5 mm.

4. The tire according to claim 3, wherein the radial distance between the contact edge corners of the ribs, in line with which an undulation is located, and the transverse radius of the ribs is at least equal to 0.5 mm and at most equal to 1.5 mm.

5. The tire according to claim 1, wherein a rib in line with which an undulation of a crown reinforcement is located is such that its contact edge corner joins the transverse radius of the rib along a continuously variable curve.

6. The tire according to claim 1, wherein a rib in line with which an undulation of a crown reinforcement is located is such that its contact edge corner joins the transverse radius of the rib along a rounded portion having a radius at least equal to 2 mm and at most equal to 8 mm.

7. The tire according to claim 1, wherein a rib in line with which an undulation of a crown reinforcement is located is such that its contact edge corner joins the transverse radius of the rib along a chamfer that forms an angle with the transverse radius at least equal to 10° and at most equal to 45° along an axial length at least equal to 2 mm and at most equal to 10 mm.

8. The tire according to claim 1, wherein the minimum radial distance $d_o$ is at least 1.5 mm less than the radial distance $d_c$.

9. The tire according to claim 1, wherein the minimum radial distance $d_o$ is at most 5 mm less than the radial distance $d_c$.

10. The tire according to claim 1, wherein, at a radius of an axially outermost point of the tire, an axial distance $d_g$ between an axially innermost reinforcer layer of the carcass reinforcement and an axially innermost point is at most equal to 7 mm.

11. The tire according to claim 1, wherein an undulation of the undulated layer is present in line with all the ribs on the tread surface.

12. The tire according to claim 1, wherein an undulation of the radially outermost undulated layer is present only in line with the ribs on the tread surface that are axially closest to a median circumferential plane, on either side of the median circumferential plane.

13. The tire according to claim 1, wherein a radial distance $d_u$ between the radially outer surface of the radially outermost layer of the crown reinforcement and the tread surface is at least equal to a radial distance $d_f$ between the tread surface and a radially outermost point of wear indicators.

14. The tire according to claim 1, wherein a minimum radial distance $d_u$ between the radially outer surface of the radially outermost layer of the crown reinforcement and the tread surface is at most equal to the depth D of a closest circumferential furrow plus 4 mm and at least equal to the depth D of the closest circumferential furrow minus 2 mm.

15. The tire according to claim 1, wherein the depth D of the at least one circumferential furrow is at least equal to 4 mm and at most equal to 9 mm.

16. The tire according to claim 1, wherein at least one element of padding rubber, having a radial thickness at least equal to 0.3 mm, is in line with any undulation of an undulated layer.

17. The tire according to claim 16, wherein the tread is made of a rubber compound, and wherein the at least one element of padding rubber is a rubber compound that has a dynamic loss tan $\delta 1$, measured at a temperature of 23° C. and under a stress of 0.7 MPa at 10 Hz, at most equal to the dynamic loss tan $\delta 2$ of the rubber compound of which the tread is made, measured at a temperature of 23° C. and under a stress of 0.7 MPa at 10 Hz.

18. The tire according to claim 1, wherein elements of padding rubber, in line with the at least one undulation, are disposed radially on an outside of the carcass reinforcement.

19. The tire according to claim 1, wherein elements of padding rubber, in line with the at least one undulation, are disposed radially on an inside of the at least one working layer.

* * * * *